US007624031B2

(12) United States Patent
Simpson et al.

(10) Patent No.: US 7,624,031 B2
(45) Date of Patent: Nov. 24, 2009

(54) ONLINE METHOD AND SYSTEM FOR FULFILLING NEEDS RESULTING FROM PROPERTY AND OTHER SIMILAR LOSSES

(75) Inventors: Douglas Simpson, Wethersfield, CT (US); Alan Aleia, Glastonbury, CT (US); Donald Pierce, Enfield, CT (US); Donald Cadden, Bristol, CT (US); Joseph Carvalko, Milford, CT (US)

(73) Assignee: The Hartford Fire Insurance Company, Hartford, CT (US)

( * ) Notice: Subject to any disclaimer, the term of this patent is extended or adjusted under 35 U.S.C. 154(b) by 1128 days.

(21) Appl. No.: 09/865,827

(22) Filed: May 25, 2001

(65) Prior Publication Data

US 2002/0035528 A1    Mar. 21, 2002

Related U.S. Application Data

(60) Provisional application No. 60/207,246, filed on May 26, 2000.

(51) Int. Cl.
*G06Q 10/00*    (2006.01)
(52) U.S. Cl. .................................... 705/4; 705/2; 705/3
(58) Field of Classification Search .................. 705/2–4
See application file for complete search history.

(56) References Cited

U.S. PATENT DOCUMENTS

| 4,831,526 | A | * | 5/1989 | Luchs et al. | 705/4 |
| 5,307,262 | A | * | 4/1994 | Ertel | 705/2 |
| 5,655,085 | A | * | 8/1997 | Ryan et al. | 705/4 |
| 5,704,045 | A | * | 12/1997 | King et al. | 705/35 |
| 5,845,256 | A | * | 12/1998 | Pescitelli et al. | 705/4 |
| 5,850,442 | A | | 12/1998 | Muftic | |
| 5,950,169 | A | * | 9/1999 | Borghesi et al. | 705/4 |
| 5,991,733 | A | | 11/1999 | Aleia et al. | |
| 6,269,343 | B1 | | 7/2001 | Pallakoff | |

(Continued)

OTHER PUBLICATIONS www.progressive.com (published on Mar. 1, 2000).*

(Continued)

*Primary Examiner*—Vivek D Koppikar
(74) *Attorney, Agent, or Firm*—Howard IP Law Group, P.C.

(57) ABSTRACT

A method of fulfilling needs acquired as a result of property and other similar losses, the method involving the steps of directing a person or entity with a need resulting from a loss to a site on a global computer network, interviewing the person or entity at the site to obtain information about the person or entity and the need they have, and analyzing and processing the information to provide the person or entity automatic access at the site to at least one service that will go toward fulfilling the need of the person or entity. In addition to the method, a system for fulfilling needs acquired as a result of property and other similar losses, the system including a site on a global computer network for fulfilling needs of persons or entities acquired from property and other similar losses, the site having an interviewing component for obtaining information about the person or entity and the need they have, and a data analyzing and processing component for analyzing the information provided by the person or entity and providing the person or entity automatic access at the site to at least one service that will go toward fulfilling the need of the person or entity.

34 Claims, 5 Drawing Sheets

U.S. PATENT DOCUMENTS

| | | | |
|---|---|---|---|
| 6,347,302 | B1 | 2/2002 | Joao |
| 6,386,444 | B1 | 5/2002 | Sullivan |
| 6,453,297 | B1* | 9/2002 | Burks et al. .................... 705/3 |
| 2002/0019754 | A1* | 2/2002 | Peterson et al. ................ 705/4 |

OTHER PUBLICATIONS

"New Software Enables Self-Service Transactions for Group Life/Health;" By Ara C. Trembly; published in Technology on Mar. 4, 2002, p. 34.*

"Cutting Out the Middleman;" May 31, 1999; ISSN: 0893-8202; National Underwriter Life & Health-Financial Services Edition, vol. 103, No. 22, p. A15.*

"Automating Collision claims;" May 1994; Lafferty Ltd. Insurance Industry International; p. 13.*

Revenge of the the Bricks; by Ron Panko; Gale Group, Inc,; A.M. Best Company, Inc. Best's Review; No. 1, vol. 102; p. 27; ISSN: 1527-5914. IAC-ACC-NO-74938853.*

"Building a self-service culture that works." by Samuel Greengard, Workforce, vol. 77, No. 7, p. 60, Jul. 1998, ISSN: 0811-9023. Dialog ID No. 10371791. From Dialog File 148 (Gale Group Trade & Industry).* https://personal.progressive.com/interact-cgi/claim_list.asp?ClaimSent=0119992701579 (published on Apr. 6, 1999).*

"Progressive, Inside and Out"; by Greg MacSweeney; Insurance and Technology; Sep. 30, 1999, p. 13 (From Dialog File: ABI/Inform).*

"Customers or Foremost Insurance Group Companies Can Now File Claims on the Company's Web Site" (PR Newswire, New York; Jun. 22, 1999, p. 1.*

Micheletti, Mary, "Insurance Settlements Now Online", Law Office Computing, Costa Mesa, Jun./Jul. 1999, vol. 9, Issue 3, pp. 20, 30 [Retrieved from ProQuest on Sep. 27, 2002] ISSN: 1055128X.

Autobytel.com to "Offer Powerful New Insurance Services", Partnership With InsurQuote Enables Consumer Comparison Shopping, PR Newswire, New York, Jun. 24, 1999 [Retrieved from ProQuest on Sep. 27, 2002].

* cited by examiner

ONLINE METHOD AND SYSTEM FOR FULFILLING NEEDS RESULTING FROM PROPERTY AND OTHER SIMILAR LOSSES

This application claims priority to U.S. Provisional Patent Application Ser. No. 60/207,246, entitled CLAIMSPLACE, filed May 26, 2000 and is hereby incorporated by reference.

FIELD OF THE INVENTION

This invention relates to a method and system used over a global computer network such as the Internet, for fulfilling needs acquired by persons and/or entities as a result of claims for losses to person or property.

BACKGROUND OF THE INVENTION

Today, the process of insurance claim handling for consumers or insurance policy holders is scattered among some 2500 insurance companies, thousands of agents, adjusters, and appraisal firms, dozens of struggling call centers and countless other service providers. A great deal of the process is manual and paper-based, and almost none of it is centralized. Each company owns, operates and pays for its own processing system, each one trying to accomplish the same general goals, each system and process redundant of the competitors' systems. Such older paradigms can often benefit from newer technological advances coupled with innovative methods of doing business. The convergence of information technology, the internet and concomitant methods of doing business offer opportunities to create efficiencies by way of lower costs and greater satisfaction to consumers.

The widespread use of the Internet as it relates to the insurance industry is restructuring and combining traditional value chains, products and services into entirely new products and services which were not possible before. This dramatic restructuring of global business and industry is creating new value chains in what is now commonly called the Network Economy.

One value chain that is likely to be changed forever is the service of taking, recording and handling routine insurance claims. Current claim handling systems are inefficient when viewed in the context of the economy as a whole. For example, every insurance company has its own claims departments, processes and associated overheads. Insurance companies must pass on the costs associated with these departments, processes and overheads in the form of higher premiums to its customers. The paradigm of submitting a loss claim to an insurance company also removes the loss payee from the process of recovering from the loss in a substantive way. As such, the present processes do not provide the insurance consumer or loss payee certain choices that may otherwise be available to satisfy the requirement for being made whole with respect to a loss.

Although the current system of handling claims has been adjusted and fine tuned, it does not employ the powerful tools of Internet communications or network economics that the Internet makes possible. To reduce insurance claim's handling costs and to realize greater levels of efficiency and customer satisfaction, newer technologies must be employed. Tremendous opportunities for revenue are possible when Internet business methods are applied to the entire claim handling process, from the moment of first report, through the reinsurance indemnity process.

The use of the Internet opens up the possibility of centralizing claims processing for an entire industry. In this manner, the insurance industry can obtain the benefits that accrue from one resource rather than the multiple disparate discrete claims handling resources that currently exist.

Through centralizing the claim process and making it accessible to the insurance consumer, the traditional institutional approach to remediating a loss is placed into the hands of the person suffering the loss. This may create opportunities to aggregate the kinds of services and products that a loss payee requires to satisfy the loss. As such, the centralized system can consider volume purchasing of services and products to satisfy the loss payee requirements. Such volume purchasing would lower the cost of goods and services that collectively the insurance industry pays today.

A centralized claim processing center that is accessible by customers, insurance companies and other institutions dealing with the claim loss process, would be beneficial in terms of standardizing a claim's fulfillment, offering choices among competing options for recovering from losses, reducing the overhead costs associated with settling claims, and creating ancillary benefits that only can be achieved from the process of centralization.

Because a centralized conduit for claims processing does not exist in the United States, it is not possible to collect the types of information and data that would be helpful in analyzing how to bring additional efficiencies to the claim loss process. For example, the collection of data regarding the universe of claims may assist in a more equitable rate setting among carriers. Another example where the collection of claim data may be advantageous is in analyzing recovery costs from certain types of losses and determining whether such losses correlate to region or other identifiable statistic.

The existence of a centralized collection of claims would allow subrogation claims files to be created. Once the value of such files are established, there may be a market for their sale. Essentially an exchange of marketable subrogation claims could be created.

Accordingly, a system and method is needed that will enable all parties involved in a loss claim process including but not limited to customers, carriers, agents, brokers, claims service representatives (CSRs), suppliers, and attorneys to resolve needs stemming from loss claims at a central, branded, secure website serving claims for multiple participating insurers. Such a site would also permit the aggregation of products and services to fulfill the loss recovery activity. Additionally, such a site would permit the aggregation of subrogation claims that could thereafter be sold or auctioned in an exchange environment.

SUMMARY OF THE INVENTION

The present invention is drawn to a computer system and a method that takes insurance claim inputs from any number of sources, incorporates deep domain knowledge about claim processing, aggregates services and products related to loss recovery and employs Internet market-making tools to provide services to consumers, insurers and other related commercial interests.

More specifically, the invention opens an online claim reporting hub, where individuals and institutions are able to report details of personal and commercial insurance claims such as auto, homeowners and business claims against any insurer, at any time. The system accepts input from the Internet and responds to the user graphically, in sound, and in printable forms. The insurance institutional users of the system and method will direct respective policyholders and agents to the system providing 24 hour, 7 day per week, Internet claim service handling. The system preserves the user's privacy while online and at the same time, provides the marketing of products and services related to the user's needs as they typically relate to an insurance loss.

To preserve the generality of the claim it is anticipated that the any number of different persons may report a loss, such as an individual who experienced an insurance loss, an entity that anticipates claims against its policy or a witness to a loss. Examples of such reporters can include a consumer or policy holder, an insurance company, a potentially responsible party to a lawsuit, or someone who is reporting the event, but whose specific role has not yet been defined.

In one sense, the invention is a method that serves as a public adjuster, shifting the power to the buyer or consumer. From a consumer perspective, the system affords the ability to "reconstruct" or rehabilitate its claims and process claims with the least involvement of claims personnel. The process of reconstruction includes a consumer's ability to create and maintain a personal claim file online and look into it from time to time to view how the resolution of the claim is progressing.

Claimants will essentially own the claims and drive the web-based insurance process of the invention. This process is an "open-system" which permits consumers to process their own claims and utilize the ancillary services and commodities offered. In its idealized form, the invention permits the claim process to proceed without an agent, broker or an insurance company.

The invention also contemplates an online consumer to business exchange, wherein the site operates as a multi-party portal where vendors of goods and services will advertise and offer the types of products that an individual or business requires to rehabilitate a loss. By way of example, an individual that has an automobile accident may require a short-term rental replacement vehicle. The vendors that supply such rentals would offer automobiles to the individuals suffering the loss and seeking to rent.

In one embodiment, the system and method offers suggestions as to which automobile rental agencies carry rental vehicles within the coverage that the policy permits. The invention also suggests other vendors or services where appropriate. If one company cannot or will not handle a certain task or requirement (i.e. collecting a deductible), the visitor will be presented with a message stating this, and offering alternatives, such as a certain vendor offering to purchase the visitor's deductible.

In another embodiment, the system and method allows for demand aggregation of products and services specific to insurance loss fulfillment. Demand aggregation is relatively new, because until Internet capabilities, demand aggregation has not been practical. The method of the invention permits the purchase of large volume commodities and services, using purchasing power based upon the number of claimants needing a particular service or commodity.

In another aspect of the invention, in a business-to-business exchange, sellers, market makers and investors can transact for wholesale claims, post-accident purchase and sale of tranches of risk obligations and subrogation rights. The system and method automatically scores a claim to determine the likelihood of recovery and then values the claim. The subrogation opportunity is valued by reviewing criteria such as accident description, loss state, responsible party, and other pertinent demographics. Once the system and method assigns a subrogation score and a valuation, the claim is bundled or pooled with other claims that have some commonality to the newest claim. Thereafter, the bundled set or portfolio is valued as to its sale price. As the central market for wholesale claim service and financial liquidity, the invention will utilize network economics to further slash claim handling costs to its participating insurance companies, while building an electronic database about claims handling.

The invention distinguishes over conventional exchanges for auctioning off assets by dealing in the auctioning, purchase and sale of tranches of risk obligations and subrogation rights as "choses in action".

The invention allows selected users to a search a database for similar claims in order to identify potential or possible claims which may develop as class action suits or mass tort claims. Such a search may be done without revealing the identities of the individual claimants. Additionally, the invention permits the pooling of common issues into anonymous class action groups.

The invention allows selected users to a search a database and essentially mines data that is collected during the claims process. Among other things, data mining is valuable because it allows for the sale of non-personal data to interested parties. For example, data could be used for rate making or underwriting scoring and as such, would be useful to state agencies as well as insurance companies.

Since a wide range of individuals and persons will access the system for purposes of filing claims, it will utilize various automated fraud screening devices to keep track of frequent claimants as well as claims having the indicia of fraud.

The method of the invention, as it relates to fulfilling needs acquired as a result of losses to person or property, comprises the steps of directing a person or entity with a need resulting from a loss to a site on a global computer network, interviewing the person or entity at the site to obtain information about the person or entity and the need they have, and analyzing and processing the information to provide the person or entity automatic access at the site to at least one service that will go toward fulfilling the need of the person or entity.

The system of the invention comprises a site on a global computer network for fulfilling needs of persons or entities acquired from property losses and other similar losses. The site has an interviewing component for obtaining information about the person or entity and the need they have, and a data analyzing and processing component for analyzing the information provided by the person or entity and providing the person or entity automatic access at the site to at least one service that will go toward fulfilling the need of the person or entity.

BRIEF DESCRIPTION OF THE DRAWINGS

The advantages, nature, and various additional features of the invention will appear more fully upon consideration of the illustrative embodiments now to be described in detail in connection with accompanying drawings wherein.

DETAILED DESCRIPTION OF THE INVENTION

Figure 1:
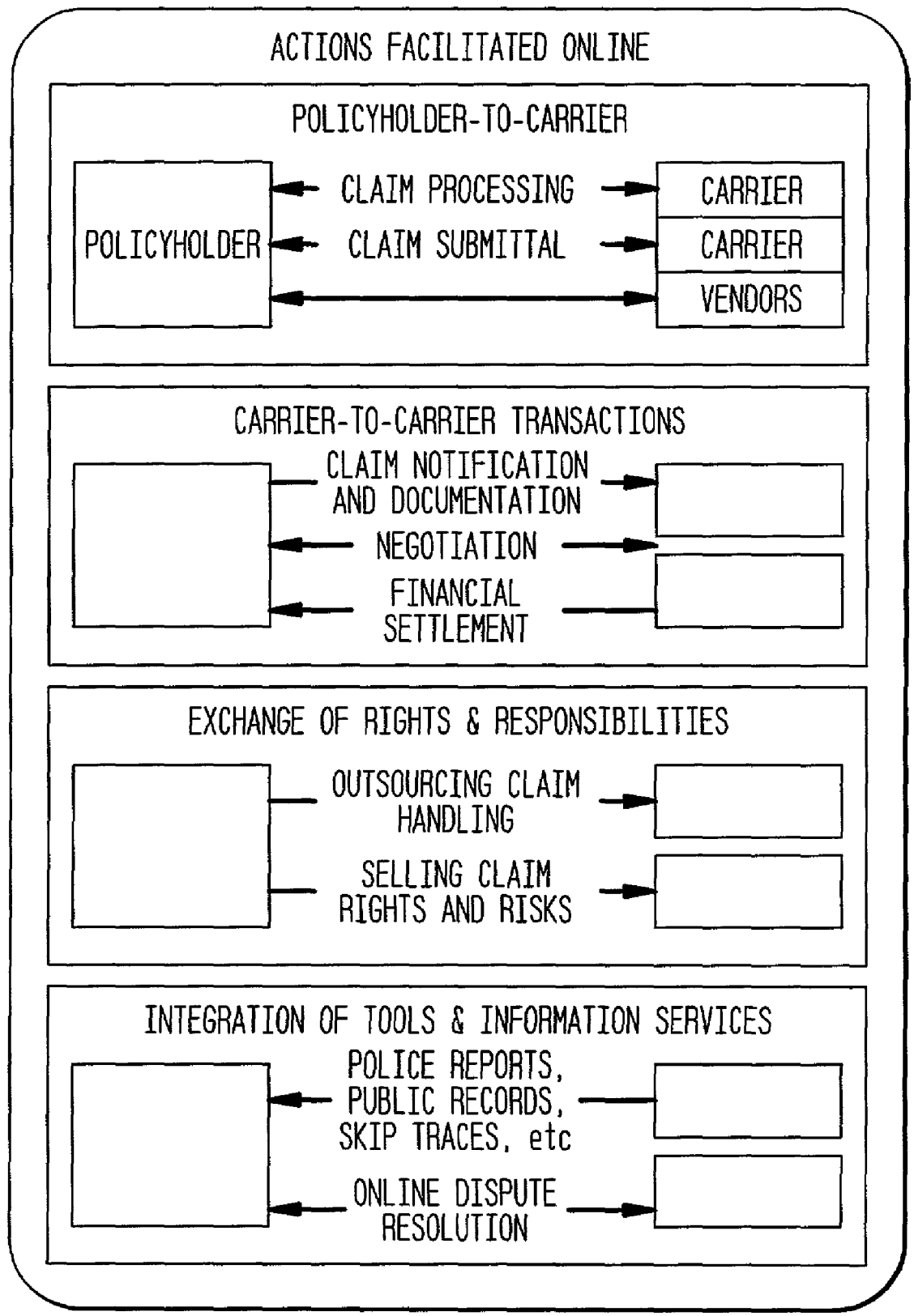
FIG. 1 is a block diagram illustrating typical actions, which can be facilitated online at the web site according to the invention.

The present invention is a system and method for enabling a person or entity with a need resulting from a loss relating to property, automobiles, boats, etc. to have the need fulfilled or satisfied on a site of a global computer network such as the well known Internet. For example, a policyholder who sustains a loss would have a need to report an insurance claim for the loss and have the claim settled. The policyholder may also require access to various related services, which help the policyholder with other issues, related to the loss.

In a typical embodiment of the invention, a web site is provided on the World Wide Web where such needs can be fulfilled. The web site permits any person or entity having a need resulting from a property loss to fulfill the need online. Such persons or entities can include policyholders, insurance carriers, insurance agents, insurance brokers, insurance customer service representatives, entities anticipating claims against its insurance policy, suppliers, attorneys, police officers, witnesses to the event or accident that caused the loss, and other persons or entities with a need that results from the loss. One particularly useful aspect of the invention is that it eliminates the need for claimants to go through an agent, broker or the insurance company to file a loss claim.

The web site also provides claimants with various other services that help claimants deal with losses. These services typically include immediate access to emergency services, vendor referrals, claim tracking, loss prevention, frequently asked questions (FAQs), and self-guided user help.

The emergency service feature of the web site provides claimants with services that resolve immediate issues, which result from losses. Emergency services typically include automobile rental services, emergency housing or housing repair services.

The vendor referral service is typically offered during the claim reporting process as described below, and provides appropriate vendor services that enable a claimant to resolve various issues associated with the claim event. Available vendors are typically pre-approved by the associated insurance carrier, and include repair and replacement services. Vendor referrals are preferably aggregated in the invention to lower the price of the services.

The claim tracking service permits a claimant to review a reported claim, check on the status of a claim, and request feedback via email or by phone regarding the status of a claim. This includes a claimant's appraisal and loss recovery status.

The loss prevention service permits claimants to access discounts at vendors that offer services to mitigate future loss prevention (i.e. vendors that sell smoke detectors). In addition, valuable information can be provided which describe steps for preventing similar claims in the future.

The FAQs service provides access to a series of questions frequently asked at the time of a loss report concerning issues such as claim adjustment procedures, claimant required activities, payment timing, affects of claims on policy premiums, and the like.

The self-guided user help service provides an interactive, real-time discussion feature and access to a "natural language" smart search engine, which enables claimants to ask questions that were not addressed in the FAQs. Further, the user help service can perform an assessment of the claimant's current insurance policy and lifestyle in order to best fit their changing needs. This may also include real-time discussion with agents to answer claims questions and referrals to other counseling services.

The web site further operates as a multi-party portal or "business to business" exchange where vendors of goods and services, client insurers, reinsurers and investors and other interested parties transact for wholesale claim services and post-accident purchase and sale of risk obligations and subrogation rights. The web site provides a central market for wholesale claim service and financial liquidity, utilizing network economics to slash claim handling costs to participating insurance companies. The web site also builds an electronic database about claims handling.

As illustrated in FIG. 1, typical actions which can be facilitated online at the web site include but are not limited to policyholder-to-carrier transactions; carrier-to-carrier transactions; exchange of rights and responsibilities; and integration of tools and information. Online policyholder-to-carrier transactions can include submitting a loss claim, opening a claim file, notifying various entities such as the insurance carrier, police, medical authorities, workers' compensation authorities and essentially anyone having salience in the claim reporting scheme. Thereafter the claimant may inspect its file, correspond with various resources that have some bearing on processing the claim. Online carrier-to-carrier transactions can include for example claim notification and documentation, negotiation, and financial settlement. Online exchange of rights and responsibilities can include for example outsourcing claim handling and selling claim rights and risks. Online integration of tools and information services can include for example police reports, public records, skip traces, and the like, and online dispute resolution.

Figure 2:
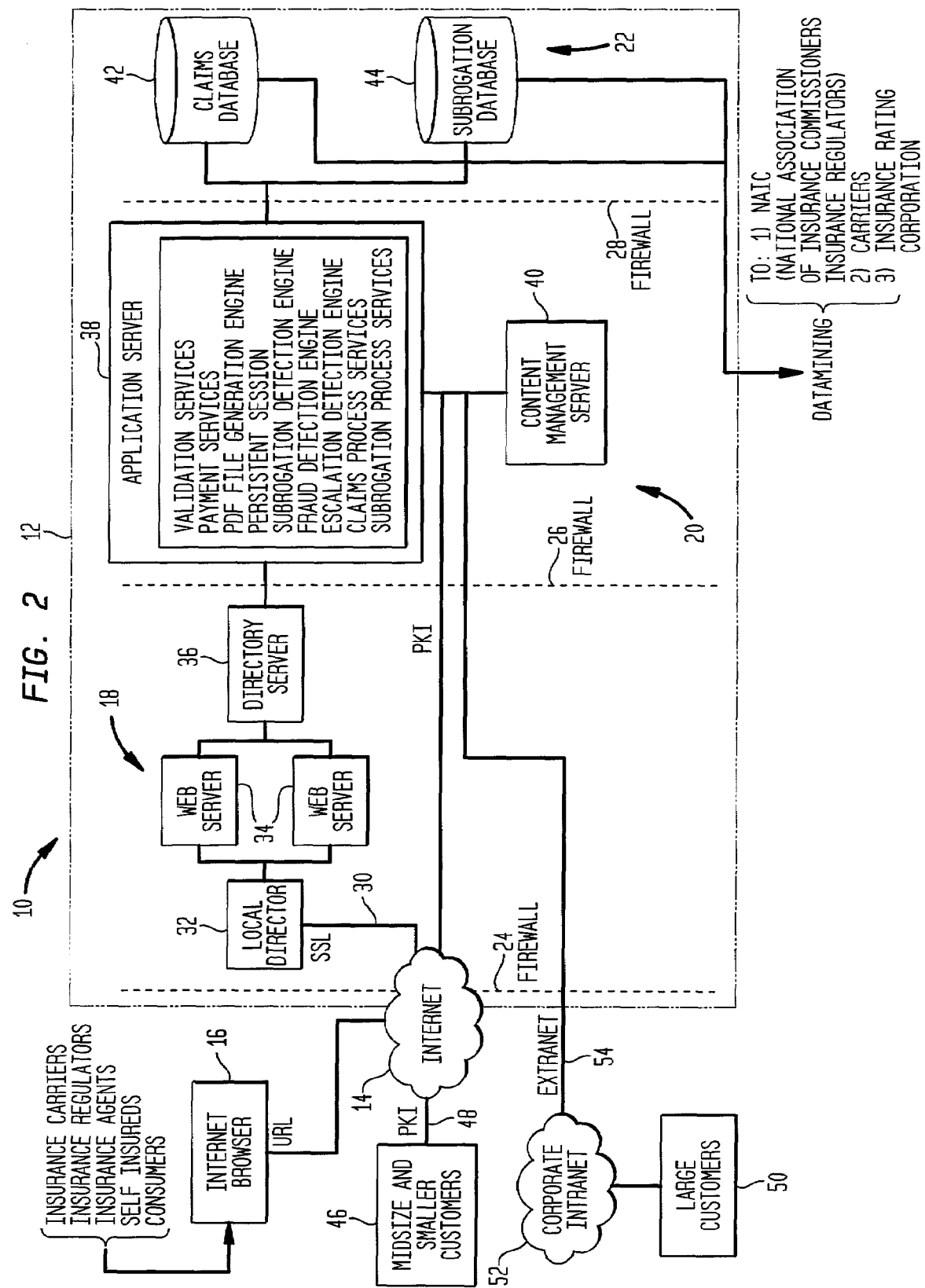
FIG. 2 is a block diagram of a system for carrying out the invention.

Referring now to FIG. 2, a block diagram is presented of an exemplary embodiment of a system 10 from which a web site according to the invention is built. The system 10 typically comprises a web application server 12 which is communicable via the Internet 14 or any other global computer network with microprocessor based devices 16 typically used by claimants (insurance carriers, insurance regulators, insurance agents, self insureds, consumers), that include Internet browser software. Such microprocessor based devices can include home personal computers, vehicle on-board tracking systems, voice data input/response systems, public access kiosks, or hand-held computers to name a few. The application server 12 typically includes well known hardware and software components which operate to define three back-end layers: a web server layer 18, an application server layer 20, and a data layer 22. Each layer is protected by a firewall 24, 26, 28 that prevents unauthorized access by Internet users. A secure sockets layer 30 (SSL) is provided between the Internet 14 and the web server layer 18 to provide privacy, authentication, and message integrity. The web server layer 18 includes a local director 32 that routes signals to a pair of web servers 34, and a directory server 36. These servers 34, 36 are the communication links between the application server layer 20 and the internet 14. The application server layer 20 includes an application server 38 which handles all data manipulation and tagged pages such as programmed in XML or HTML page-creation functions and a content management server 40. The data layer 22 includes a first database 42 for storing claims data and a second database 44 for storing subrogation data. The web application server 12 advantageously allows the deployment of applications in a scalable fashion to accommodate increasing user demands over time and permits interfacing with existing business systems. The web application server 12 is also designed to be communicable with midsize and smaller claimants 46 via a public key infrastructure 48 (PKI). Large corporate claimants 50 on corporate intranets 52 can communicate with the web application server 12 via an extranet 54.

Figure 3:
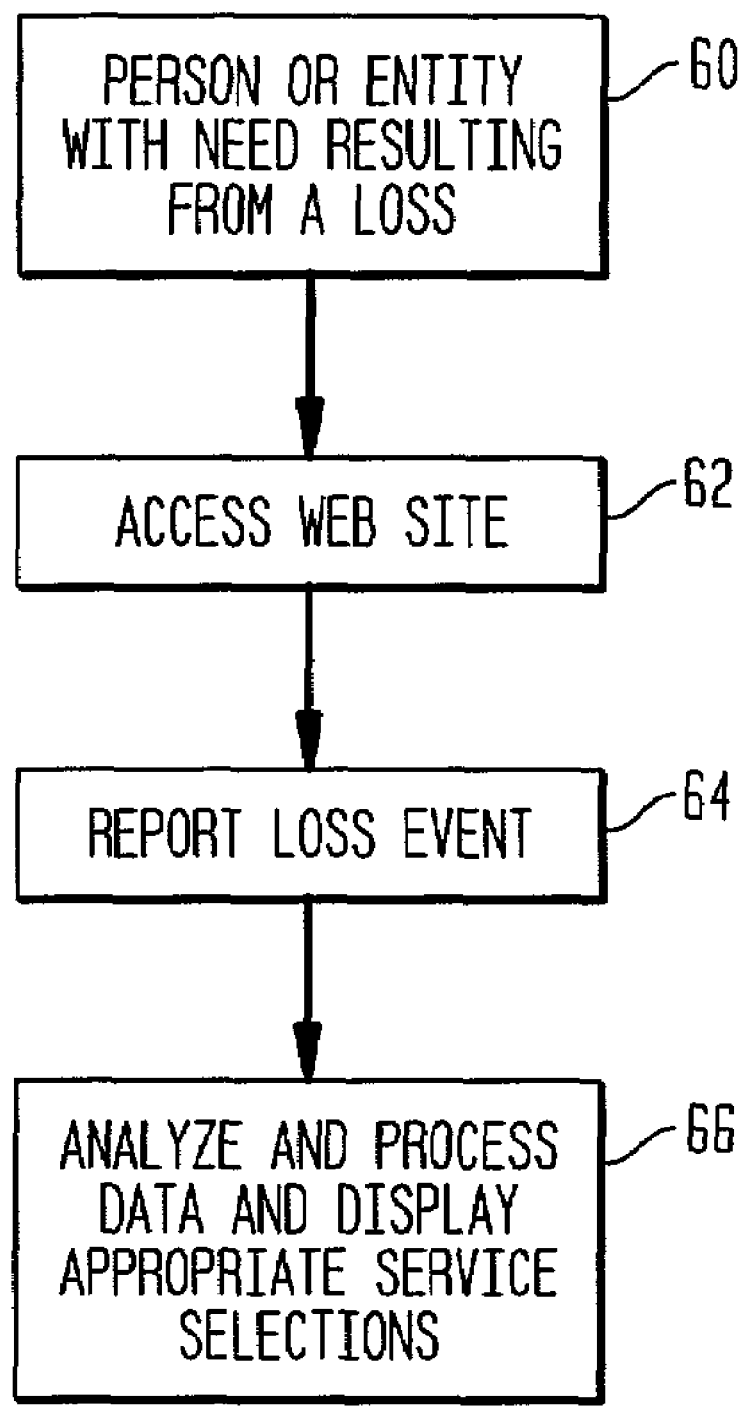
FIG. 3 is a block diagram, which illustrates the operation of the invention.

FIG. 3 is a block diagram that illustrates how needs arising from loss claims are processed on the web site in accordance with an embodiment of the method of the invention. In box 60, a person or entity that has a need resulting from an accident or event, which causes a loss, accesses 62 the web site. Such persons or entities can be policyholders and agents directed to the site by insurance companies who subscribe to the site. In some embodiments of the invention, incentives can be employed which encourage the use of the web site for reporting claims online. Incentives can take the form of a gift menu that empowers web site users to choose a gift or a gift certificate at participating online vendors, or cash-back based on their needs.

At the web site, a web page is displayed in box 64, which enables the person or entity to report a loss event, which results in a need. The web site in box 66 analyzes and processes the data reported in the reporting step of box 64 and provides appropriate service selections, which will fulfill the need of the person or entity.

During the reporting step of box 64, the web site initiates an online user-friendly interview process. This is accomplished by generating online forms or questionnaires that enable the person or entity (referred to hereinafter as claimant) to provide all the necessary information associated with the claim event so that a claim can be filed and resolved online. Such forms will comply with Accord, state and industry standards.

The data provided by the claimant is then analyzed and processed in box 66. This involves identifying the claimant; verifying insurance coverage; summarizing the information or data obtained from the claimant; identifying subrogation opportunities, fraud, and claims that require an escalation of services; matching the claimant with the appropriate services in order to fulfill the claimant's needs; aggregating demands; and data storing.

The claimant identification process permits the determination of what the claimant's needs are so that appropriate steps can be automatically taken to resolve the claimant's needs as these steps are affected by carrier preferences, jurisdiction requirements, and availability of solutions. During the identification process, the information provided by the claimant is analyzed in order to identify the claimant as a policyholder, a witness, insurance company, or other person or entity with a need resulting from the loss.

The insurance coverage verification process determines what solutions are available to the claimant. The information/data summarizing process provides the claimant with a confirmation email that can be printed out locally for the claimant's records. The email also summarizes policy claim information and the next steps in the process. A file is also created for the claimant which can be easily accessed by the claimant at the web site at a later date via the claim tracking function. This file enables the claimant to inquire as to the status of the claim to view how the claim is progressing.

The processes for identifying subrogation opportunities, fraud, and claims that require service escalation; claimant matching; and demand aggregating are performed by an automated rules engine. An example of such a rules engine is described in U.S. Pat. No. 5,991,733 issued to Aleia, et al. on Nov. 23, 1999 for a "Method and computerized system for managing insurance receivable accounts." The disclosure of U.S. Pat. No. 5,991,733 as it relates to the rules engine is incorporated herein by reference. The computerized system described in U.S. Pat. No. 5,991,733 provides, among other capabilities, for cases processed in-house by collectors, automation respecting scripted dispute handling, on-line payment plan capabilities, electronic data transfer and, collection strategy development, for cases referred to an outside collection agency or attorney, automation respecting facsimile generations, legal strategy development, in-house attorney reviews and monitoring, electronic data transfers to local counsel, evaluation of the next step to be undertaken and, access to a bankruptcy database.

Figure 4:
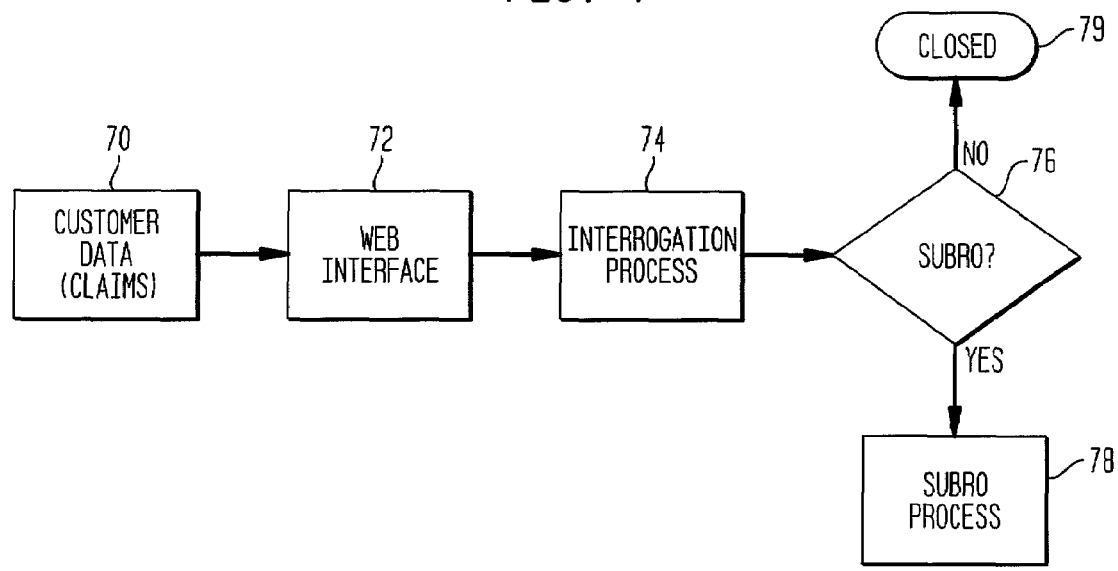
FIG. 4 is a block diagram, which illustrates how subrogation opportunities are identified according to the invention.

As illustrated in FIG. 4, subrogation opportunities are identified using the claim data 70 obtained at the web site 72 during the interview or interrogation process 74. The claim data is analyzed 76 for state, type of claim, accident description, loss date, claim notes, presence of a favorable police report, existence of an insurance carrier, and other similar criteria. As subrogation opportunities are identified, the claimant's file is passed to the subrogation process 78 for servicing as will be explained further on. If no subrogation opportunity is found, the file is closed 79.

Claim events that require escalated carrier and/or other responsiveness (i.e. police response to a fatality) are automatically routed to the appropriate carrier, adjuster, and other appropriate parties to resolve the claim event as soon as possible.

Claimant matching is accomplished by presenting the claimant with service selections which are based on the type of claimant the person or entity was identified as by the system in the claimant interviewing process, and providing service selections which are customized for the claimant. Claimant matching optimizes the claimant's experience in the claim process and continues until the claimant is satisfied. In one embodiment of the method, the service selections can include preferred vendor services discounts where claimants will have access to discounts at featured vendors. If the nature of the reported claim, the location of the event, and the claimant's insurance carrier dictates the use of one of these vendors, a hot button to the vendor's web site will be displayed at the site. If the claimant selects one of these vendors, the selected vendor is contacted in real-time in order to expedite resolution of the claim event. In another embodiment of the method, the service selections can include online claims settlement options. Claimants are provided with options for accepting and settling the loss reimbursement of the claim online. The settlement is subject to the automatic appraisal of the claim, acceptance of a predetermined settlement amount, and access to external settlement engines such as online alternative dispute resolution services.

Demand aggregation is performed by going into the market and either purchasing a commodity/service or arranging for the purchase of a commodity/service using the demand aggregator's volume purchasing power provided by the large number of claimants needing that particular service or commodity. Methods for purchasing commodities and/or services or arranging for such purchases using demand aggregation are described in U.S. patent application Ser. No. 09/545,402, entitled, "Methods For Processing And Settling Property Loss Claims Using Online Demand Aggregators," filed by Welnicki et al. on Apr. 7, 2000, and assigned to the assignee herein. The disclosure of U.S. patent application Ser. No. 09/545,402, as it relates to purchasing methods using demand aggregation, is incorporated herein by reference.

The data, which has been analyzed and processed, is stored in the data layer of the system or data warehouse. The data warehouse is advantageously used for reporting, resale claim aggregating and matching claimants with the appropriate services. The data warehouse typically stores data about prior selections made by claimants; stores data provided during the claimant interview process; and stores predetermined selections and preferences of insurance carriers.

The claims data stored in the data warehouse is electronically exchanged in an auction-based manner. This step of the method advantageously provides an electronic exchange for a variety of claim related services, including auctioning and portfolio transfer of claims handling responsibilities between carriers. The data warehouse can provide claims data to regulators, attorneys, venders, safety experts, underwriting and risk bearers, municipalities, news services, warning system vendors, and re-insurers to name a few.

Figure 5:
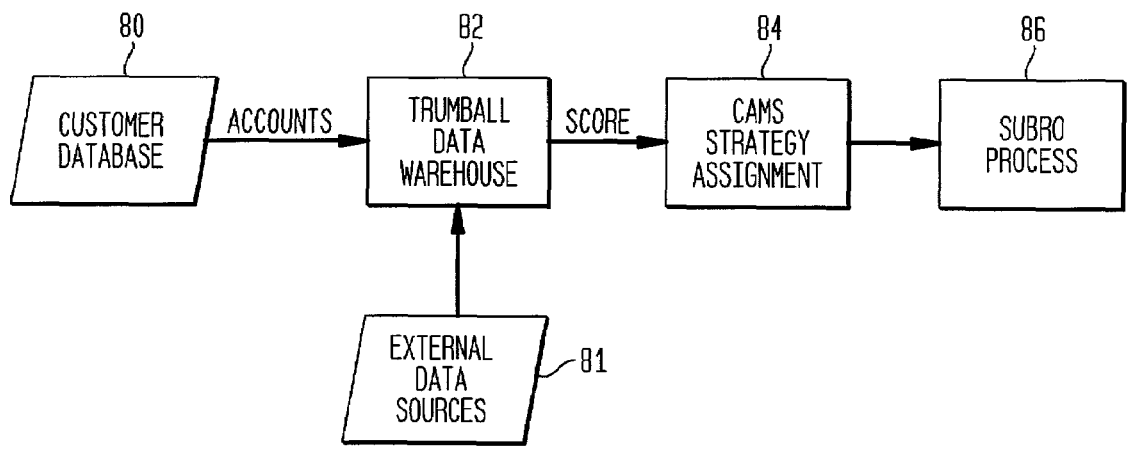
FIG. 5 is a block diagram, which illustrates the use of the data warehouse in subrogation scoring according to the invention.

The data warehouse is used for subrogation scoring. As illustrated in FIG. 5, subrogation scoring involves taking historical data stored 80, 81 in the data warehouse 82, and assigning a value 84 to such factors as customer, type of loss, line of business, balance amount, debtor demographics, and the demographics of the claim(s) as described in U.S. Pat. No. 5,991,733 mentioned earlier. Using this data, a probability of recovery is calculated. The factors and weights will vary by customer. The collection system will assign a strategy for working the account based on the score resulting from the calculated probability of recovery. The scoring is then applied to a grouping of claims/accounts to determine the aggregate value of the group. The value of the group is used in a subrogation claim exchange process 86 to be described below.

If the person or entity in the reporting step of box 64 wishes to engage in some form of claim data exchange, the site will automatically provide access to this service online. Claim data exchanges can take the form of transacting for wholesale claim services, or post-accident purchase and sale of tranches or portfolios having risk obligations and subrogation rights. Exchanging subrogation claims facilitates bulk transactions between insurance carriers, subrogation service providers, and the investment community. The ultimate goal of the method and system of the invention is to provide a maximum return to all parties involved in the transaction. The claims exchange process of the invention achieves this goal by enabling participants to buy, sell and service claims for all lines of business. The claims exchange feature of the invention permits matching of purchasers with portfolios that meet predetermined requirements, i.e., accounts may be placed, bought, sold, evaluated, serviced, submitted to arbitration, and settled online via the claims exchange process.

Figure 6:
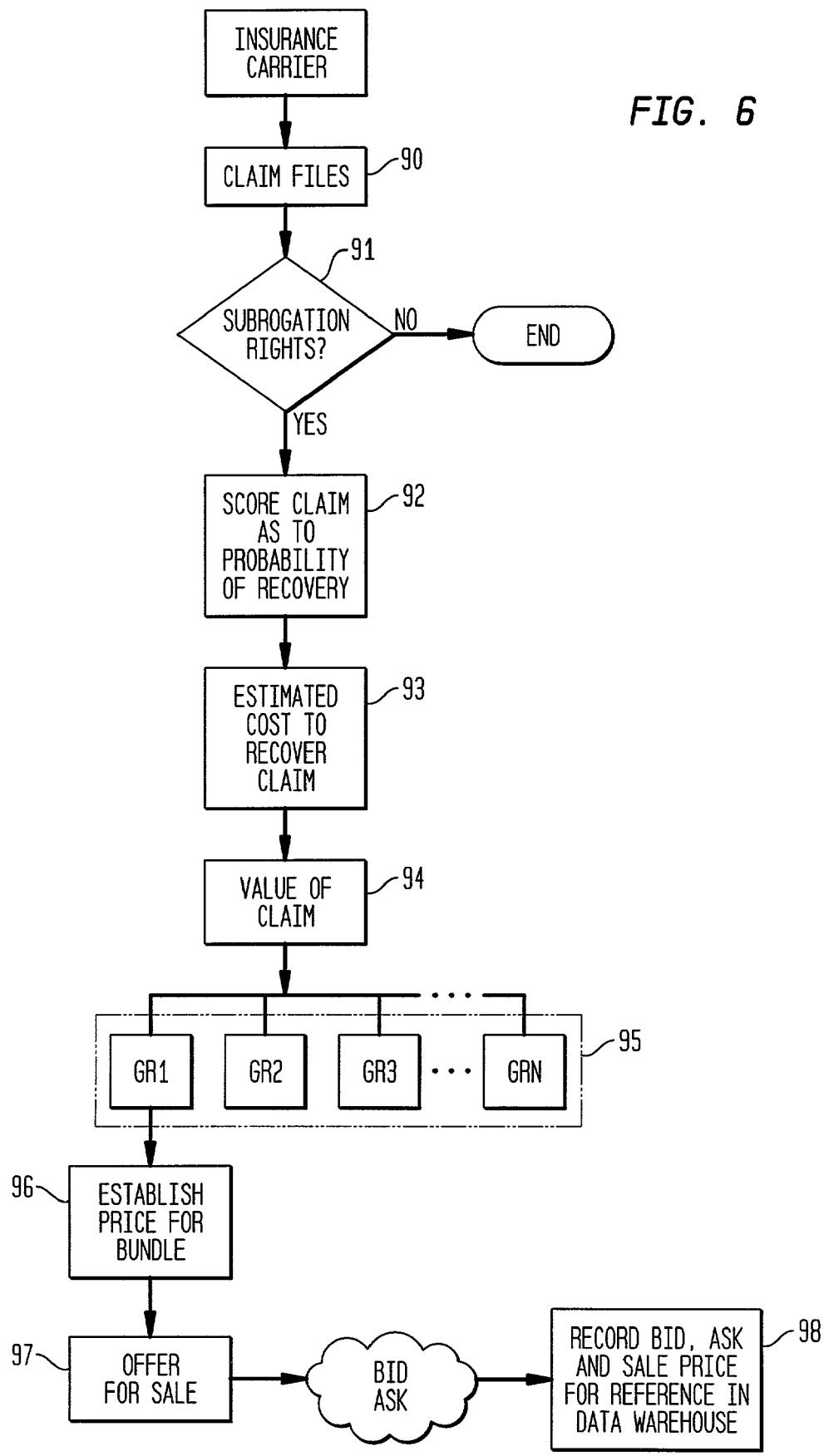
FIG. 6 is a block diagram, which illustrates how the invention compiles, values and sells subrogation rights.

FIG. 6 illustrates how the invention compiles, values and sells subrogation rights. The claims files 90 stored in the data warehouse mentioned earlier are searched to identify 91 claims with subrogation rights. A claim with subrogation rights is scored 92 as to the probability of its recovery, and the cost of recovering the claim is estimated 93. The recovery score and the estimated cost of recovery are used to set a value 94 for the claim. Once the claim is valued, it is bundled or pooled 95 into a group with other claims that have some commonality to the claim. In particular, the claims are grouped according to pre-established criteria, examples of which include but are not limited to dollar value, type of claims (automobile, homeowners) state or region. The bundled group or portfolio of claims is then valued 96 as to its sale price and offered for sale 97 in an auction-like manner. The bid, ask and sale prices are then recorded 98 in the data warehouse.

As should now be apparent to those skilled in the art, the Internet web site-based claim-reporting feature of the invention operates as a central point for the collection of claim event information. The invention will simplify the claims management process and reduce the trouble, time, and expense that claimants and carriers typically incur in order to complete the claim reporting and loss reimbursement process. The claims reporting web site of the invention offers significant sources of value for the insurance carriers, policyholders, and agents. Insurance carriers that subscribe to the service can reduce expenses and improve their customer service. Policyholders are empowered with convenient access to report a claim, step-by-step guidance on the claim reporting process, and control over the decisions that can help to resolve their claim event.

Subscribed carriers can offer value-added services to their policyholders at typically half the present market cost of reporting a claim. Once a critical mass of claim reporting and vendor selection data is collected at the web site, subscribed carriers have access to purchase valuable database of information for benchmarking purposes. This information can be offered at about half the cost of what leading insurance carriers currently pay for this information.

Policyholders of subscribed carriers can report and access claims at their convenience, access referrals to preferred vendors (auto-body shops, glass repair facilities, jewelry stores, contractors, etc.) to help recover from the loss, and begin the recovery process to settle the claim expeditiously. The invention permits enhanced value-added services to be phased into the claims reporting system, which policyholders can utilize to exploit the convenience, control, and functionality of the Internet.

While the foregoing invention has been described with reference to the above embodiments, additional modifications and changes can be made without departing from the spirit of the invention. Accordingly, such modifications and changes are considered to be within the scope of the appended claims.

What is claimed is:

1. A computer system comprising:
   a site generating component generating a site on a global computer network allowing claimants to directly input information for insurance claims under insurance policies issued by one or more insurance companies for sustained losses;
   a claim data analyzing component analyzing the inputted information and identifying the claimants, verifying insurance coverage and summarizing the claims based on the analyzing; and
   a claim rehabilitation component aggregating services related to loss recovery and automatically providing the aggregated services to the claimants to rehabilitate the sustained losses in accordance with said analyzing;
   wherein, the site generating component, claim data analyzing component and claim rehabilitation component enable claimants to communicate, without action by personnel of the one or more insurance companies, directly with third party providers, not affiliated with the one or more insurance companies, of the services related to loss recovery.

2. The computer system according to claim 1, wherein the site is operative as an online claim reporting hub that permits the claimants to report details of personal and commercial insurance claims against any of a plurality of insurers.

3. The computer system according to claim 2, wherein the claimants include individuals and institutions.

4. The computer system according to claim 2, wherein the input insurance claims are selected from the group consisting of automobile claims, homeowners claims and business claims.

5. The computer system according to claim 2, wherein the site generating component accepts inputs from the global computer network and respond to site users graphically, in sound and in printable forms.

6. The computer system according to claim 1, wherein the system provides continuous network claim service handling.

7. The computer system according to claim 1, further comprising a privacy preserving component for preserving site users' privacy while online at the site.

8. The computer system according to claim 1, wherein the system is adapted to process claims without an agent, broker or an insurance company.

9. The computer system according to claim 1, wherein the site is operative as an online consumer-to-business exchange that permits vendors of goods and services to advertise and offer products that individuals and businesses require to rehabilitate a loss.

10. The computer system according to claim 1, wherein the claim rehabilitation component suggests multiple vendors and services for performing tasks and requirements associated with rehabilitating a claim.

11. The computer system according to claim 1, wherein the site is operative as an online a business-to-business exchange where sellers, market makers and investors transact for wholesale claims, post-accident purchase and sale of tranches of risk obligations, and subrogation rights.

12. The computer system according to claim 11, further comprising an automatic claim scoring and valuing component for automatically scoring a claim to determine the likelihood of recovery and valuing the claim.

13. The computer system according to claim 12, wherein the automatic claim scoring and valuing component values a claim's subrogation value by reviewing criteria including accident description, loss state, and responsible party and then assigns a subrogation value to the claim.

14. The computer system according to claim 13, further comprising a claim bundling component that bundles the scored and valued claim into a group of claims that have commonality to the claim.

15. The computer system according to claim 14, further comprising a sale price determining component for determining a sale price for the bundled group of claims.

16. The computer system according to claim 1, further comprising a database which permits selected users to search for similar claims, thereby enabling the selected users to identify potential claims which are likely to develop as class action suits or mass tort claims.

17. The computer system according to claim 16, further comprising an identity concealment component for concealing the identities of claimants of the claims when searching for similar claims in the database.

18. The computer system according to claim 17, further comprising a pooling component for pooling common issues into anonymous class action groups.

19. A method comprising the steps of:
generating a site on a global computer network allowing claimants to directly input claimant, insurance and claim information for insurance claims under insurance policies issued by one or more insurance companies for sustained losses;
analyzing the inputted insurance claim information to identify the claimants, verify insurance coverage and summarize the claims;
aggregating services related to loss recovery; and
automatically providing the aggregated services to the claimants to rehabilitate the sustained losses in accordance with said analyzing;
wherein, the generating, analyzing, aggregating and providing enable claimants to contact directly, without action by personnel of the one or more insurance companies, vendors, not affiliated with the one or more insurance companies, of the aggregated services relating to loss recovery.

20. The method according to claim 19, wherein the site is operative as an online claim reporting hub that permits insurance claims to be input against any of a plurality of insurers at substantially any time.

21. The method according to claim 20, wherein the insurance claims are selected from the group consisting of automobile claims, homeowners claims and business claims.

22. The method according to claim 20, wherein the site generating step includes accepting inputs from the global computer network and responding to site users graphically, in sound and in printable forms.

23. The method according to claim 19, wherein the site generating step includes providing continuous network claim service handling.

24. The method according to claim 19, further comprising the step of preserving site users' privacy while online at the site.

25. The method according to claim 19, wherein the site is operative as an online consumer-to-business exchange that permits vendors of goods and services to advertise and offer products that individuals and businesses require to rehabilitate a loss.

26. The method according to claim 19, wherein the aggregating step includes suggesting multiple vendors and services for performing tasks and requirements associated with rehabilitating a claim.

27. The method according to claim 19, wherein the site is operative as an online business-to-business exchange where sellers, market makers and investors transact for wholesale claims, post-accident purchase and sale of tranches of risk obligations, and subrogation rights.

28. The method according to claim 27, further comprising the step of automatically scoring a claim to determine the likelihood of recovery and valuing the claim.

29. The method according to claim 28, wherein the automatic claim scoring and valuing step as it pertains to valuing a claim's subrogation value includes reviewing criteria including accident description, loss state, and responsible party and assigning a subrogation value to the claim.

30. The method according to claim 29, further comprising the step of bundling the scored and valued claim into a group of claims that have commonality to the claim.

31. The method according to claim 30, further comprising the step of determining a sale price for the bundled group of claims.

32. The method according to claim 31, further comprising the steps of providing a database and permitting selected users to search for similar claims, thereby enabling the selected users to identify potential claims which are likely to develop as class action suits or mass tort claims.

33. The method according to claim 32, further comprising the step of concealing the identities of claimants of the claims during the claim searching step.

34. The method according to claim 33, further comprising the step of pooling common issues into anonymous class action groups.

* * * * *